2 Sheets—Sheet 1.
G. W. KIDD.
Process and Apparatus for Distilling Alcohol.
No. 227,018. Patented April 27, 1880.
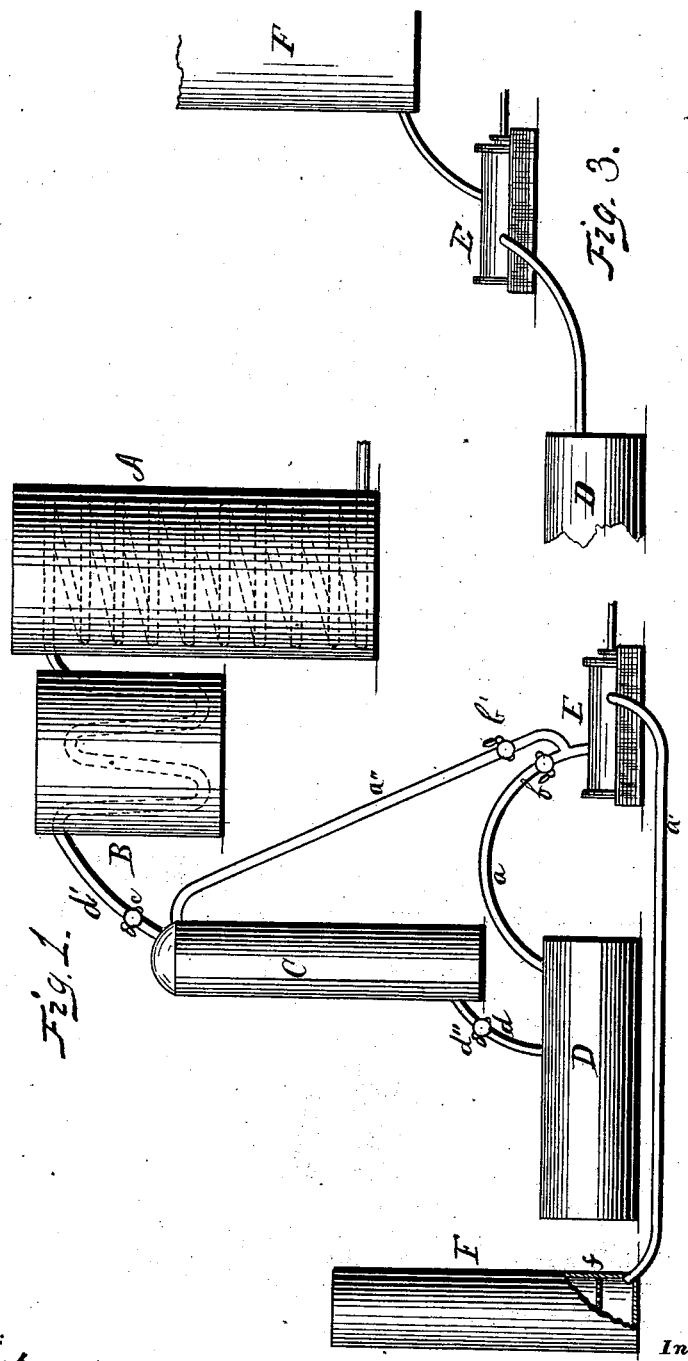
Witnesses:
E. H. Bates
B. T. Hanley
Inventor:
Geo. W. Kidd
by his atty
Hoct. West G. W. KIDD.
Process and Apparatus for Distilling Alcohol.
No. 227,018. Patented April 27, 1880.
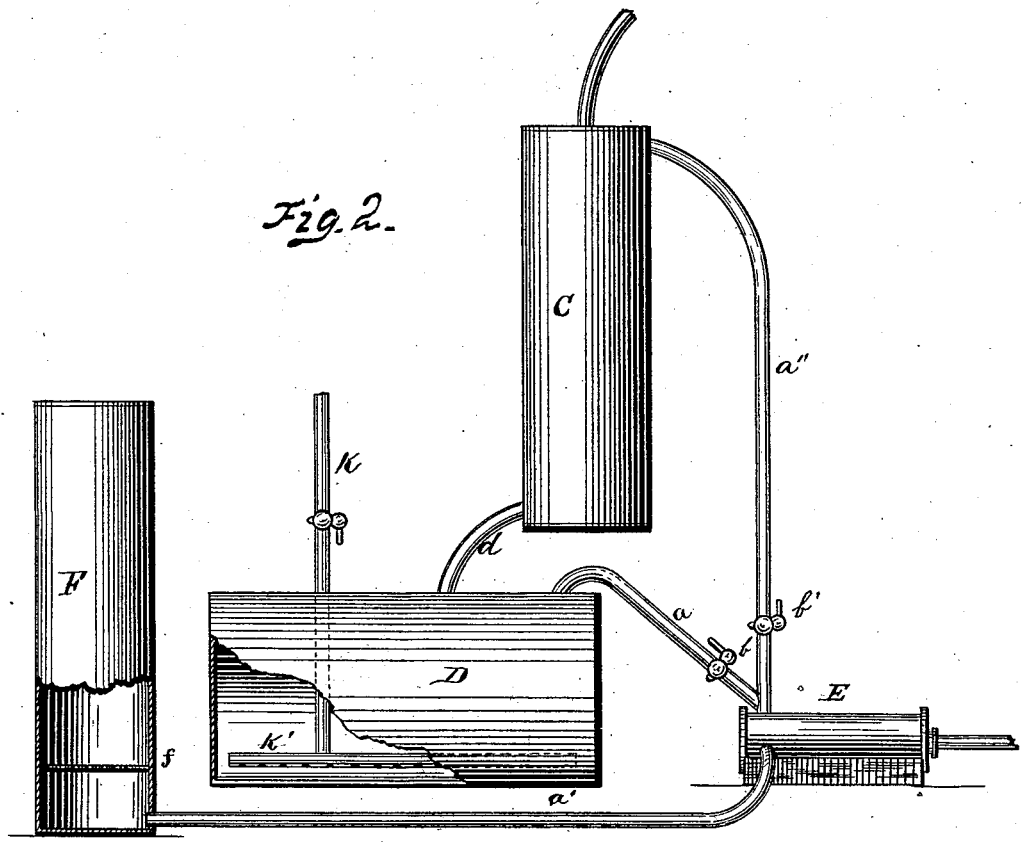

UNITED STATES PATENT OFFICE.

GEORGE W. KIDD, OF NEW YORK, N. Y.

PROCESS AND APPARATUS FOR DISTILLING ALCOHOL.

SPECIFICATION forming part of Letters Patent No. 227,018, dated April 27, 1880.

Application filed January 28, 1880.

*To all whom it may concern:*

Be it known that I, GEORGE W. KIDD, of the city of New York, in the State of New York, have invented a new and useful method or improvement in processes and apparatus for separating foul or impure ethers or vapors from the still, column, goose, or worm and other connections during the process of distilling or redistilling spirits or whisky, of which the following is a specification.

The whisky or spirit from which cologne (French) or odorless spirit or alcohol is ordinarily distilled has mingled with it substances in the form of condensed ethers and other foul impurities, which, when heated in the still or column, emit or yield noxious vapors or gases, which, in the usual process of distilling or redistilling whisky or spirit, become condensed in passing through the column, goose, and worm, and unite with the alcoholic spirit, injuring its quality. These vapors or gases also foul the chambers of the column and pipes of the goose and worm and their connections, thereby rendering them unfit for the production of a higher quality of odorless spirit.

The object of my invention is to produce a perfectly odorless pure alcoholic spirit by removing the deleterious vapors or gases which vaporize at a temperature below that at which alcohol distills from the whisky or spirit previous to or during the process of distillation; and to this end my invention consists—

First, in subjecting the whisky or spirit while yet in the still or column to a temperature of lesser degree of heat than that required to vaporize spirit—say, about 140° Fahrenheit—which temperature these ethers, gases, or other impurites may evaporate at; and while such impure but lighter vapor ascends before that of the vapor of the spirit or alcohol, such impure vapors may be extracted from the still, column, or goose, or connections by means of a pipe or pipes connected therewith, and through and with these pipes a suction or vacuum pipe is attached, thereby drawing from the still, column, connection-pipes, or goose all these foul impure gases or ethers, thus preventing them passing through the goose or worm, to which they may attach themselves if allowed to pass through and foul these pipes, and remain in said pipes to mingle with the vapor of the spirit.

Second, the vacuum-pump above mentioned I connect by suitable pipe-connections directly to the still-chamber or to the top of the still-column, by which means the foul vapors and ethers are withdrawn from the still or column, as circumstances may require, and not allowed to pass into the goose, worm, or condensing pipes to coat and foul them and render them unfit for the subsequent distillation and production of a pure odorless spirit.

Third, this vacuum - pump discharges the foul vapors and gases into a body of water; and, to avoid the loss of any vapors that may contain spirit, I design that the discharge of the vacuum-pump be introduced into the bottom of a tank of water, above which exhaust of noxious vapors into said tank a plate with many holes, or a sieve, be placed, to necessitate the vapor more thoroughly distributing itself through the water, so that all vapor containing spirit may be absorbed by the water and come in closer contact with the water by small globules made by the perforated sheet or upper bottom or sieve through which the gases and vapors have to pass before reaching the main body of water.

Fourth, in preventing the ethers or foul gases from passing through the goose or worm by placing a stop-valve cock, or what is known as a "butterfly-damper," between the places at which the suction or vapor pipe is to be connected and the goose, worm, or other pipes, so that this will effectually stop any vapors passing into the main goose or worm pipes or connections, and force the same through the pipe, which it is not necessary to attach a vacuum-pump to, so that this stop-cock damper or valve directs the vapor through other channels than the regular course for spirit vapor, and thereby prevents the fouling of the goose, worm, and other connecting-pipes with any coating from the foul noxious vapors, as would be the case if allowed to pass through and be condensed therein.

Fifth, in permitting a current of pure air to pass through the body of the whisky, spirit, or matter to be purified and distilled, the same issuing through perforated pipe or pipes at or near the bottom of the still or purifying vessel or tank, and caused to rise rapidly without back-pressure through the whisky or spirit by suction or exhaust of the air and vapors from above the body of the whisky or spirit or matter being treated for the production of a perfectly-pure odorless alcohol in the still-column or other connections, by which means the foul and noxious vapors and deleterious substances are thoroughly separated from the whisky or spirit, and fouling or coating of the goose, condenser, and pipes prevented.

To enable others skilled in the art to practice my invention, I will proceed to describe the same, reference being had to the accompanying drawings, in which—

Figure 1 is a plan view of the apparatus; Fig. 2, a plan view with a portion of the still or tank broken away to show the perforated air-pipe; and Fig. 3 is a plan view of a modification.

The condenser A, the refrigerator B, and the column C may be of any approved construction. The still D is provided with the pipe $a$, which connects the still with the vacuum-pump E, and the pipe $a'$ connects the vacuum-pump with the auxiliary condenser F. The condenser F is to be filled with water, and it is provided near its bottom with a perforated partition, $f$, through which the vapors as they issue from the pipe $a'$ are compelled to pass, causing thorough separation thereof and more perfect condensation and absorption.

The still D is connected with the column C by the pipe $d$, which has the cock $d''$ in it, and the column is connected to the refrigerator B by the ordinary pipe $d'$, which has the butterfly-damper $c$ in it, opening into the open air or into some pipe-connection.

In operation, the matter to be treated is placed in the still and slowly heated, either by heat applied to the outside of the still or by a steam-coil within. The vacuum-pump should now be put in operation and continued in operation until the matter within the still is gradually raised in temperature to a point at which the refined odorless spirit vaporizes and begins to come over. The action of the vacuum-pump should now be discontinued, and the cock $b$ in the pipe $a$ closed, and the cock $d''$ in the pipe $d$ opened, and the pure alcoholic vapors permitted to pass in the ordinary way through the column and condenser. Any alcoholic vapors which shall have passed out with the noxious vapors through the vacuum-pump are absorbed by the water in the condenser F and saved.

In some instances better results can be obtained by permitting the vapors taken off through the vacuum-pump to pass through the column, and for this purpose the column is connected by the pipe $a''$ with the pump. It is obvious that when the pipe $a''$ is used the cock $b'$ should be open and the cock $b$ in pipe $a$ closed.

In the apparatus constructed and operated as above described the purification and distillation are practically one and the same connected process; but although this is the preferred plan, it is obvious that the purification treatment of the whisky or spirit could be carried on in a separate apparatus—such, for instance, as that illustrated by Fig. 3, or a similar one, consisting merely of the close vessel D, the pump or vacuum mechanism E, and the condenser F, connected by pipes, as shown. In this apparatus the whisky or spirit could be treated and purified and transferred by any suitable mechanism to an ordinary still and subsequently distilled. If air is to be passed through the matter under treatment the apparatus illustrated by Fig. 2 is the preferred form, which is constructed in all respects like that illustrated by Fig. 1, save that the pipes K and K' (the latter perforated with small holes and extending along near the bottom of the still, and the former opening into the open air) are provided. The pipe K may be provided with a cock to cut off the supply of air when desired. After the supply of air shall have been cut off the vacuum and heat treatment may continue until the noxious vapors and fetid matters are entirely extracted from the matter under treatment and from the still and column.

It will be understood that the heat in all cases during the preliminary treatment of the substance must be regulated according to the extent of vacuum produced in the vessel—that is to say, the more perfect the vacuum the less should be the degree of heat.

Having thus described my invention, what I claim as new, and desire to secure by Letters Patent, is—

1. The process herein described of removing the deleterious substances at a lower boiling-point than alcohol from matter from which refined or pure spirit is to be distilled, which consists in subjecting the matter to a low heat—say about 140° Fahrenheit—and continuously and directly removing the vapor from the vessel as it is formed by exhaust, as and for the purposes set forth.

2. The method of distillation herein described, whereby a refined odorless spirit is produced, consisting in first subjecting the matter from which the refined odorless spirit is to be distilled, while the same is contained in the still, to vacuum exhaust or suction and heat, then discontinuing the exhaust, and, finally, conducting the distillation in the ordinary way, substantially as set forth.

3. The still D and column C, in combination with the vacuum-pump, the pump being connected directly with the top of the column by the pipe $a''$, substantially as and for the purposes described.

4. The still D and column C, with the pump E, the pump being connected with the top of the column by the pipe $a''$ and directly with the still-chamber by the pipe $a$, in combination with the condenser F, connected with the pump E by the pipe $a'$, substantially as set forth.

5. The still D, provided with the air-inlet pipes K and K′, in combination with the pump E, connected directly to the still-chamber and column by pipes $a$ and $a''$, whereby the foul air and noxious vapors and ethers are removed before entering the goose and condensing pipes, as and for the purposes set forth.

GEO. W. KIDD.

Witnesses:
JAS. F. HALLIGAN,
JNO. C. LEE.